May 21, 1929.    R. E. OVERTON    1,713,779
FISH STRINGER
Filed Sept. 21, 1927
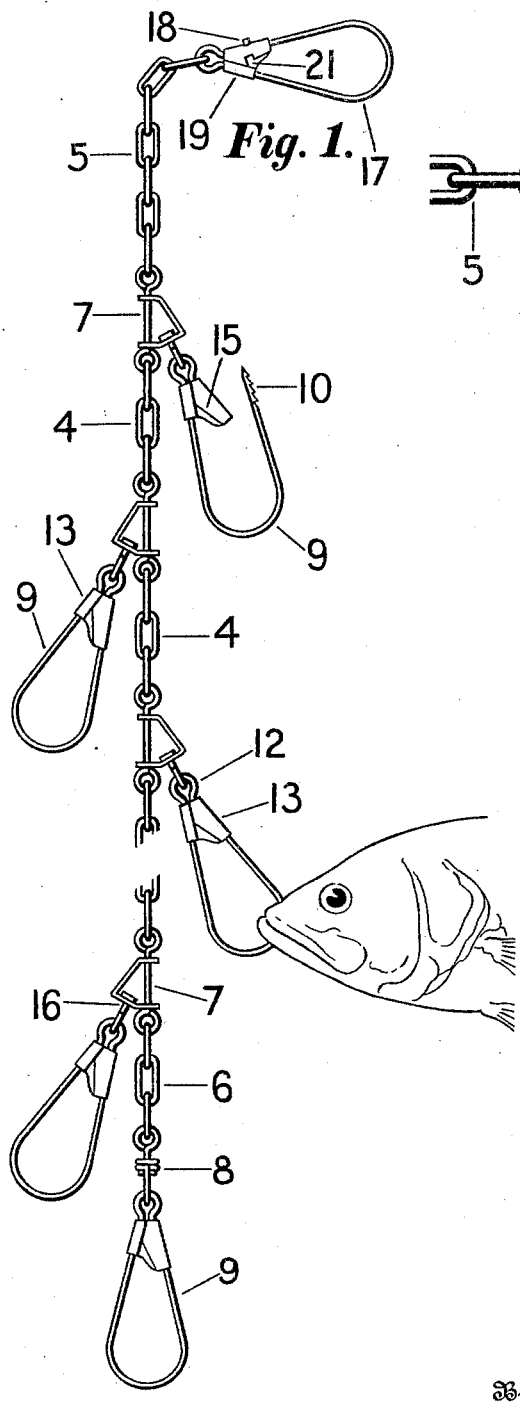
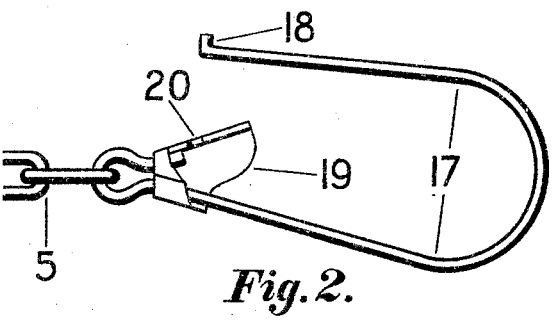
Fig. 2.
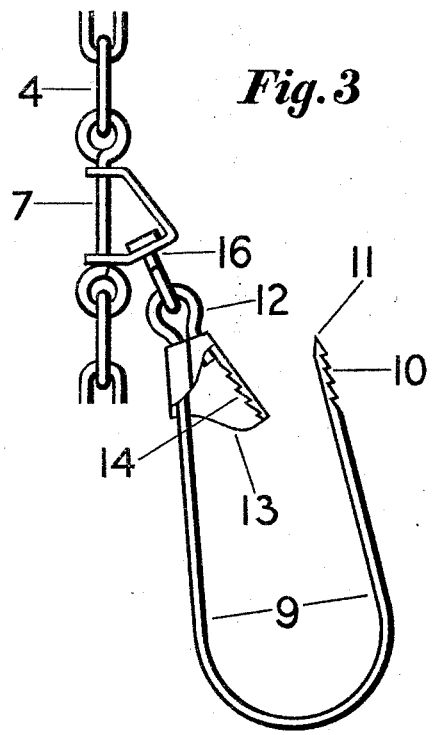
Fig. 3
Inventor
R E Overton.
By Hiram A. Sturges
Attorney Patented May 21, 1929.

1,713,779

UNITED STATES PATENT OFFICE.

RAY E. OVERTON, OF OMAHA, NEBRASKA.

FISH STRINGER.

Application filed September 21, 1927. Serial No. 221,114.

This invention relates to an improvement in fish stringers and has for one of its objects to provide a device which may be conveniently secured to a boat or other object to be moved about in the water, during the operation of fishing, may be readily detached therefrom, and will be securely held thereto when connected.

Another object is to provide a swivel for the mounting of the terminal holder of the fish stringer.

The principal object of the invention is to provide swivels between the sections of the fish stringer, each being provided with a secondary swivel, whereby the fish may have more freedom of movement than otherwise, while in the water. Other objects of the invention will be mentioned hereinafter.

With these objects in view the invention presents a new and useful construction, combination and arrangement of parts as described herein and claimed, and as illustrated in the accompanying drawings, it being understood that changes in form, size, proportion of parts and minor details may be made without departing from the invention, said changes being within the scope of the invention as claimed.

In the drawing, Fig. 1 is a broken away side view of a fish stringer embodying my invention. Figs. 2 and 3 are enlarged detail views partly in section. Fig. 2 is a side view of a fastener, and Fig. 3 is a side view of a fish-holder.

Referring now to the drawings for a more particular description, numerals 4 indicate flexible sections, one of these sections being of greater length than the others as indicated at 5 and called the main section, and a terminal section being indicated at 6.

I provide swivels 7, these being disposed between the sections and each being journalled in the ends of two adjacent sections whereby the several sections will be disposed end to end.

While I have shown chains and prefer the use of chains for these sections, I do not wish to limit myself to their use, and these sections may consist of any suitable supporting element or elements to provide a suitable length for a fish stringer.

Numeral 8 indicates a swivel which is journalled in the lower end of the terminal section 6, and as described the swivels may have free rotatable movements independently of the sections.

Numerals 9 indicate fish-holders, each consisting of a steel wire or other elastic metallic strand having an end-portion provided with teeth 10 and a sharpened or convergent terminal 11, said strand being bent to a loop-form and bent near one of its ends to provide an eyelet 12.

Numerals 13 indicate clasps, each having a rugose or notched surface 14 in its inner side, and having a slot 15 for receiving the convergent end-portion of the strand when the loop has been compressed, and permitting the teeth 10 to engage the rugose surface 14 of the clasp.

Numerals 16 indicate a plurality of secondary swivels, each being journalled in a swivel 7 and adapted to freely rotate, its axis of rotation being transverse to the axis of rotation of a swivel 7, and it will be understood that the fish-holders may be mounted upon the swivels, each eyelet 12 receiving a part of the swivel.

While I have shown and prefer the use of these secondary swivels 16 I do not wish to limit myself to their use, but may mount the fish holders on the swivels 7, if desired, and may dispense with the use of swivels 16.

It will be understood that the sharpened end 11 of the fish-holder is passed through the nose or lips of a fish, and does not engage the gills, and therefore the fish may be kept in a live condition while immersed in water.

Numeral 17 indicates a fastening-member for a mounting on the end of the main section 5, and by its use the device may be secured to a boat, drag-line or other support.

This fastener consists of an elastic metallic strand, such as steel wire bent to a loop-form with a terminal projection 18, and bent to provide an eyelet 19 for a mounting upon the end of the chain-section 5, a clasp 19 being mounted on the strand and having an aperture 20 for receiving the projection 18, when the loop has been compressed to permit this part of the loop to enter the slot 21 of the clasp 19, and on account of this construction the device may be securely attached to a support and whenever desired, may be detached therefrom.

It is well known that fish should be held yieldingly in order to prevent their escape, and that if held rigidly they may become detached from a fish stringer.

According to the present construction it will be noted that the fish may have a greater freedom of movement than ordinary. They may have a rolling movement for the reason that the secondary swivels may revolve, and they may move circularly around the sections for the reason that the swivels 7 may revolve.

I claim as my invention,—

1. In a fish stringer, the combination with a chain having swivels maintained at fixed longitudinal intervals thereof and journalled thereon, of secondary swivels journalled in and disposed with their axes of rotation transverse to the axes of rotation of the first named swivels, and fish-holder elements carried by the secondary swivels.

2. In a fish stringer, a flexible elongated holder, swivels of loop-form maintained at longitudinal intervals of and journalled at their ends upon said flexible holder, secondary swivels mounted on the first named swivels, and fish-holding elements connected with the secondary swivels.

3. In a fish stringer, a plurality of chain-sections connected end to end, swivels having journalled bearings between said sections, secondary swivels journalled in the first named swivels to permit rotation thereof transverse to the axes of rotation of the first named swivels and hooks of loop-form carried by the secondary swivels.

In testimony whereof, I have affixed my signature.

RAY E. OVERTON.